Sept. 1, 1936.    C. J. CRANE ET AL    2,053,183
AERIAL FLIGHT INTEGRATOR
Filed Nov. 7, 1930    3 Sheets-Sheet 1

INVENTORS
Carl J. Crane
William C. Ocker

BY Lancaster, Allwine and Rommel
ATTORNEYS.

Sept. 1, 1936.  C. J. CRANE ET AL  2,053,183
AERIAL FLIGHT INTEGRATOR
Filed Nov. 7, 1930  3 Sheets-Sheet 2

INVENTORS
Carl J. Crane
William C. Ocker
BY Lancaster, Allwine and Rommel
ATTORNEYS.

Sept. 1, 1936.  C. J. CRANE ET AL  2,053,183
AERIAL FLIGHT INTEGRATOR
Filed Nov. 7, 1930  3 Sheets-Sheet 3
FIG. 4.
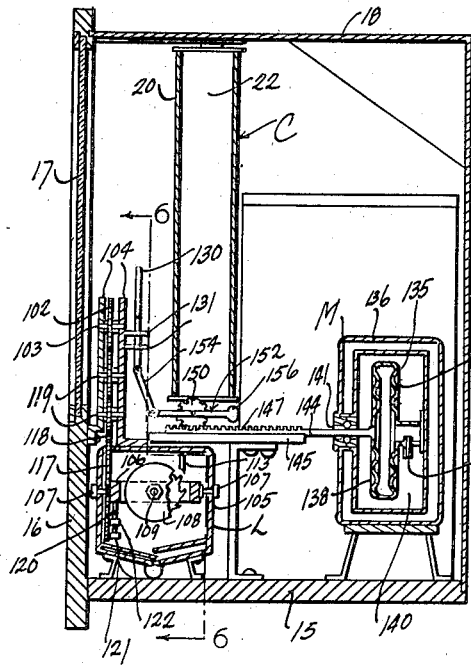
FIG. 5.
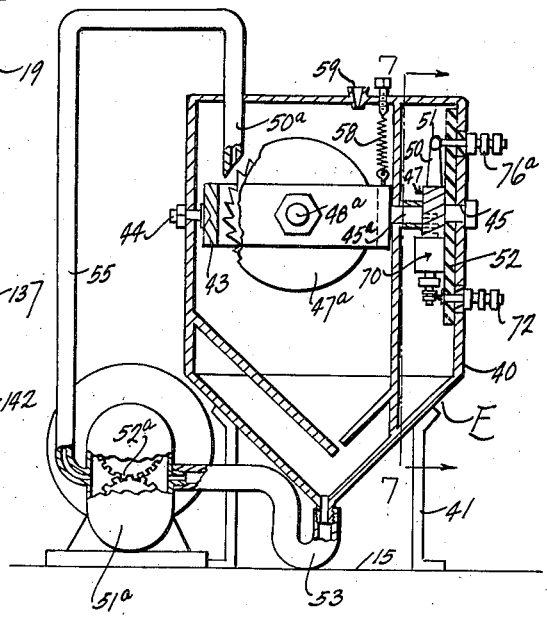
FIG. 6.
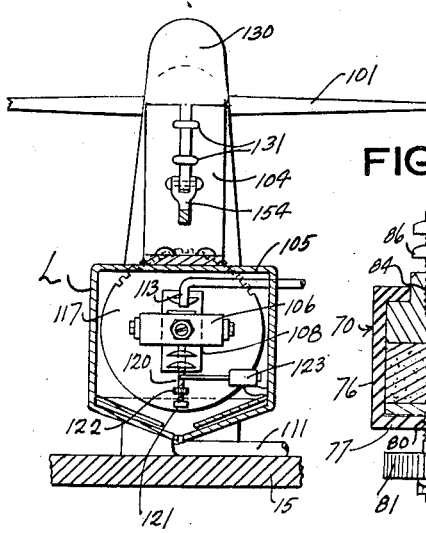
FIG. 7.
FIG. 8.
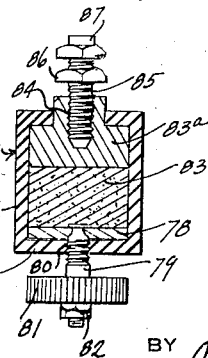
INVENTORS.
Carl J. Crane
William C. Ocker
BY Lancaster, Allwine & Rommel
ATTORNEYS.

Patented Sept. 1, 1936

2,053,183

UNITED STATES PATENT OFFICE 2,053,183

AERIAL FLIGHT INTEGRATOR

Carl J. Crane and William C. Ocker, Brooks Field, Tex.

Application November 7, 1930, Serial No. 494,131

16 Claims. (Cl. 33—204)

This invention relates to improvements in instruments to facilitate aerial flight, and has particular reference to an instrument which will give to a pilot a true stimulus of bank, turn, climb and glide during blind flight for the elimination of vertigo and erroneous illusions.

A further object of this invention is the provision of an improved flight instrument of the general character set forth in our co-pending application, Serial No. 474,540, filed August 11, 1930, and which embodies improvements thereover in the provision of indicia which will give a stimulus to the pilot which accurately corresponds with the natural stimulus received by the pilot during visual flight, that is, when the pilot is able to observe the relation of the aircraft to the horizon and the earth.

A further object of this invention is the provision of an improved tipping wing index for aerial flight instruments which is both gyroscopically and pendulum controlled.

A further object of this invention is the provision of an improved statoscopically controlled index for indicating climb and glide rate of an aircraft.

A further object of this invention is the provision of an improved gyroscopically controlled pressure rheostat device.

A further object of this invention is the provision of improved automatically controlled indicia in the same field of view of a pilot that will enable an expeditious and accurate determination of the relation of the aircraft during blind flight.

A further object of this invention consists in the provision of an improved gyroscopically controlled aircraft turn indicating screen positioned in the pilot's field of view in a co-related arrangement with respect to a gyroscopically controlled-gravity operated inclinometer, and in co-relation to a statoscopically controlled climb and glide indicator.

Other objects and advantages of this invention will be apparent during the course of the following detailed description.

In the accompanying drawings, forming a part of this specification, and wherein similar reference characters designate corresponding parts throughout the several views, Figure 1 is a front elevation of the improved aerial flight instrument.

Figure 4 is a vertical sectional view taken through the improved flight instrument substantially on the line 4—4 of Figure 2.

Figure 5 is an enlarged fragmentary sectional view showing details of the improved gyroscopically controlled rheostat device.

Figure 6 is an enlarged sectional view taken substantially on the line 6—6 of Figure 4.

Figure 7 is a fragmentary sectional view taken substantially on the line 7—7 of Fig. 5.

Figure 8 is an enlarged sectional view showing a detail of the improved pressure rheostat.

Figure 1:
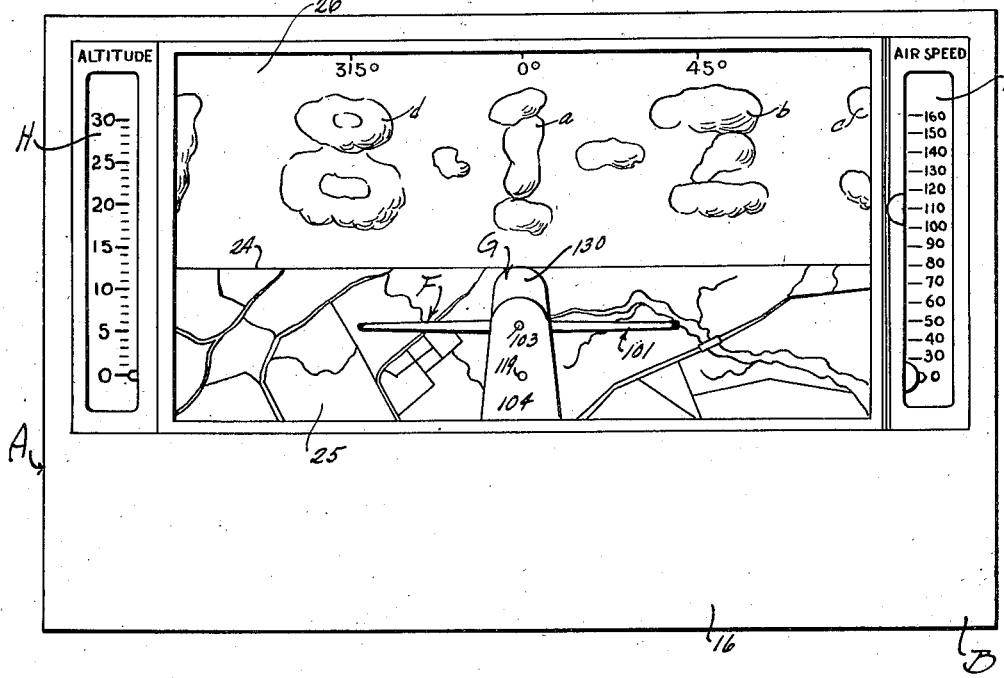

In the drawings, wherein for the purpose of illustration are shown the preferred arrangements of the invention, the letter A may generally designate the improved unitary flight instrument or integrator. It includes a casing or supporting frame B which may be mounted upon the instrument board or in other convenient location upon the aircraft. It supports an improved turn indicating apparatus C which includes a movable screen 20 operated by means of a power unit or motor D, the current through which is controlled by means of gyroscopic apparatus E. In the same field of view as the turn indicating belt 20, there is provided an inclinometer apparatus F, and a climb and glide indicating apparatus G. If desired an altimeter H and an air speed designating instrument K may be associated with the improved instrument A, and other necessary instruments may be associated in a bordering relation about the indicia of the instrument A if desired.

The casing B may vary considerably in structure. It preferably includes a base 15 provided with an upright rigidly fixed front wall 16 having a transparent panel 17 through which the pilot may observe the cooperating indicia within the casing. A preferably detachable top 18 is provided, and a rear wall 19. The front view appearance of the casing is preferably rectangular.

The screen element 20 comprising part of the turn indicating apparatus B is in the form of an endless belt, as set forth in our co-pending application above referred to, although it may take the form of a reciprocating sliding screen, or it may be in the form of a cylinder, disc, or the like. In the form shown, the belt 20 travels horizontally from left to right and vice versa, and at its ends it is trained about driven and idler rollers 21 and 22 which are mounted in suitable bearings 23 in the top and bottom walls of the casing B. The belt 20 in width is of the same dimension as the height of the panel 17, and the rollers 21 and 22 are located at the ends of this transparent panel so that substantially one-half of the external surface area of the belt element is visible through the panel and in the field of view of the pilot. The external surface area of the belt element 20, entirely surrounding the same, is provided with a view similar to the panoramic view as seen, during flight, by the pilot. It preferably consists of a horizon 24 fixed on the belt having a terrestrial view 25 depicted therebelow and a sky area 26 thereabove, which may be colored blue and have spaced clouds designated at a, b, c, d, etc. These clouds while appearing to be floating in the blue sky area are roughly in the form of numerals 1 to 8 inclusive, located at 45° intervals apart along the length of the belt, which facilitates the interpretative effort upon the part of the pilot in determining the angular degree of turn of the aircraft.

The belt 20 is of course driven by means of the motor D; the current through the latter being controlled by the gyroscope E in a manner to be subsequently described.

Figure 2:
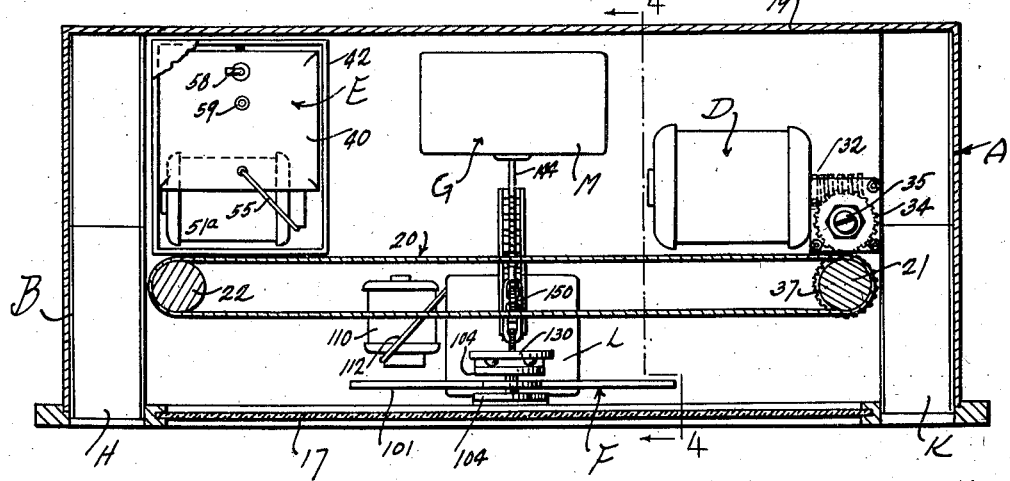
Figure 2 is a plan view, partly in section, showing the arrangement of details of the improved flight instrument.
Figure 3:
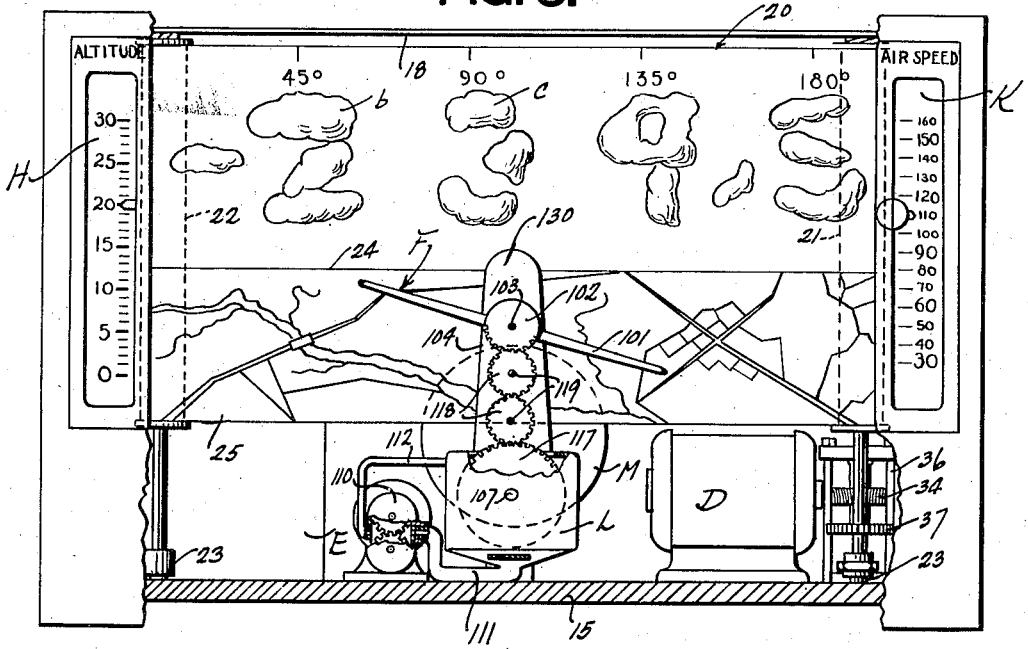
Figure 3 is a fragmentary front elevation of the improved flight instrument showing the turn screen and inclinometer as well as the climb and glide indicator in the position which they would assume during a banked climbing turn of the aircraft to the right.

The motor D is suitably mounted on the base 15 of the casing to the rear of the belt element, as shown in Figures 2 and 3 of the drawings. It has a horizontal drive shaft 32 provided with a worm portion which meshes with a worm wheel 34 rotatably mounted on a vertically disposed shaft 35; the latter bearing in suitable brackets 36 supported from the base 15. The roller 21 and the shaft 35 are suitably provided with intermeshing gears 37, by means of which the shaft 21 is driven from the motor D. Obviously, rotation of the roller 21 will cause the belt 20 to move horizonally across the field of view of the pilot.

The motor D is reversible and of the shunt wound type. The current therethrough is controlled by the gyroscopic mechanism E. It is readily apparent that the right to left or vice versa movement of the belt, due to the artificial horizon view depicted thereon will give the pilot a visual stimulus similar to the normal flight stimulus experienced by pilots during clear weather flight. The motor D is shown as of the direct current type having two or more field coil windings, and as set forth in our co-pending application above referred to, it is desirable to have a constant speed characteristic under changing loads; the variation in speed of the motor being governed entirely by the gyroscopic device E.

The gyroscope E consists of a housing or casing 40, which is suitably mounted upon the base 15 by means of brackets 41, and the entire device may be enclosed within an independent housing 42, as shown in Figure 2 and 3 of the drawings. The gyroscope E includes mechanism in some respects similar to a conventional turn indicator. It has a pivotally mounted frame 43 supported upon spindles or bearing pivots 44 and 45, one or more of which may be adjustable as desired. The axis of the frame 43 is horizontal and in alignment with the flight path of the aircraft. The frame 43 is provided with a gyroscopic rotor wheel 47ª, having its spin axis in a horizontal plane normal to the flight path, as designated at 48ª in the drawings. The gyroscopic device, so far as described, may be of the nature and construction set forth in U. S. Patent #1,433,102 if desired. The external periphery of the wheel 47 is suitably toothed or provided with depressions adapted to receive the impulse of air from a fluid jet or a nozzle 50ª.

An electrically driven pump 51 is provided for driving the rotor wheel 47ª, having suitable means 52ª therein for withdrawing the impulse fluid through a suitable conduit 53 from the bottom-most portion of the gyroscopic casing 40 and transmitting it through a conduit 55 into the nozzle 50 above described, as set forth in our co-pending application above referred to. It is quite apparent that the gyroscopic frame 42 will tend to precess when an attempt is made to change the direction of flight of the aircraft from a straight path to a lateral turn either to the right or left in accordance with principles well understood by those familiar with gyroscopically controlled turn indicators. The pivoted frame 43 is damped and returned to normal position by means of an adjustable spring device 58 of any well known type. A suitable vent 59 may be provided in the casing if desired.

The precessing frame 43 of the gyroscope has a shaft 45ª keyed therewith, and this shaft, keyed thereon, is provided with a frame 47. The frame 47 has oppositely extending horizontally disposed arms 48 and 49 and a vertically upstanding spring arm 50, preferably of the leaf type provided with a contact 51 at the top thereof. The frame 47 is of conductive material so that current may pass through either of the arms 48 and 49 and through the spring arm 50 into the head contact 51. An insulation disc 52 is affixed upon an inside surface of an upright wall of the gyroscopic housing 40 immediately facing the frame 47. Contacts 74 and 75 are carried by the insulation disc 52 on the inside surface thereof, having exterior terminal attaching nuts 76ª as shown in Figure 5 of the drawings. Suitable pressure type of rheostats 70 and 71 are provided upon the inside surface of the insulation disc 52, having suitable exterior terminal nut and bolt devices 72 carried by the housing 50 and extending exteriorly thereof for wire attachment, as shown in Figure 5. The pressure type of rheostats 70 and 71 (see Fig. 8) are of identical formation, each including a relatively small cylindrical casing 76, of insulation material, such as synthetic resin, hard rubber or the like. In the lower part thereof above the bottom wall 77 is disposed a shallow piston 78, to which is swivelly mounted an adjusting screw 79 having a threaded connection at 80 in the central part of the bottom wall 77. Externally of the cylinder 76 the screw 79 has a thumb head 81 by means of which the screw may be rotated, and suitable terminal nuts 82 are provided exteriorly upon the screw 79 for attachment of a wire extending from one of the terminals 72 above described. Within the cylinder casing 76, resting upon the top of the piston 78 there is disposed resistance material in the nature of carbon granules, designated at 83 in the drawings, which variably resists the passage of an electric current therethrough according to pressure exerted thereon. In the upper part of the casing 76 is disposed a movable piston 83ª which has a hub extending through the top wall of the casing 76, as shown in Figure 8. This hub has a screw threaded opening 84 wherein a calibrating screw 85 is placed. The screw 85 has a nut 86 thereon which may lock against the piston 83 for the purpose of adjusting the extension of the screw 85. The screw 85 has a contact head 87 thereon, which is adapted to be engaged by the outer end of one of the arms 48 or 49, depending upon the location of the pressure rheostat, as shown in Figure 7.

As shown in Figure 7, the contact 51 on the end of the spring arm 50 is adapted to engage either of the contacts 74 or 75. It is normally positioned out of contact with the contacts 74 and 75, due to the action of the damping spring 58 which returns the precessing frame of the gyroscope to a neutral position. The pressure rheostats 70 and 71 are so located upon the insulation disc 52 that the heads 87 thereof are cooperative with the outer contact ends of the arms 48 and 49 respectively. The damping spring 58 normally positions the frame 47 so that the arms 48 and 49 are out of engagement with the contacts 87 of the pressure rheostat, as shown in Figure 7.

In the improved form of gyroscope E, which it is intended may find a variable use in different arts, the gyroscope frame is not allowed to precess appreciably as a result of a turn. The precessional force set up in the frame 43 is dissipated in a slight movement of the pressure rheostat piston 83$^a$ as a result of contact of the arms 48 or 49 with the contact 87 of the piston 83$^a$. The resistance of the rheostats are adjusted by the screws 79 to place the required initial compression in the carbon pile, and calibration of the normal space between the contact ends of the arms 48 or 49 and the cap contact 87 is taken care of through adjustment of the screw 85, as is quite apparent.

Figure 9:
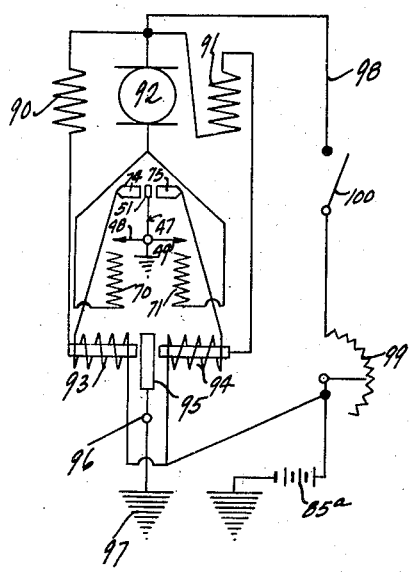
Figures 9 and 10 are diagrammatic views showing different forms of wiring diagrams for the power unit or motor which drives the belt-screen of the flight instrument.

Referring to the wiring diagrams, Figure 9 shows an armature current control wherein the motor is provided with field windings 90 and 91 connected with the armature 92 of the motor from opposite ends of the windings. The other ends of the windings 90 and 91 have suitable connection with relays 93 and 94 respectively. The windings of the relays are suitably connected to a storage battery or other electric current source 85$^a$. An armature 95 for the relays is pivoted at 96 and grounded at 97 in the same ground as the motor circuit. The relay windings at their opposite ends from their common connection in the circuit are respectively connected with the contacts 74 and 75 above described, as shown in Figure 9. The motor circuit which may be generally designated at 98 may have a manually controlled rheostat 99 therein and be provided with a suitable closure switch 100.

Figure 10:
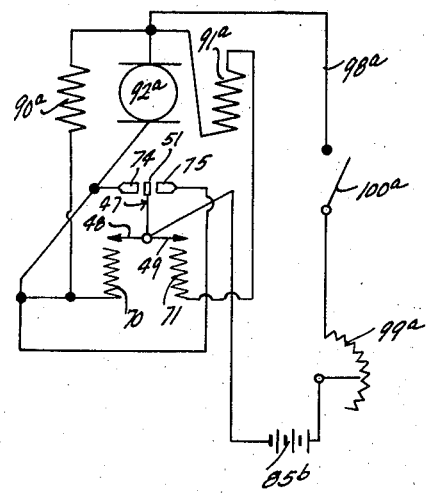

In Figure 10 is shown a field current control for the motor wherein the field windings 90$^a$ and 91$^a$ are connected at opposite relative ends with the armature 92$^a$ of the motor, and at their other ends said field coils may be connected with the resistance pressure rheostats 70 and 71 as shown. The armature 92$^a$ is suitably connected, as shown, to the contacts 74 and 75. The circuit may generally be designated at 98$^a$ and it includes a manually controlled rheostat 99$^a$ and a closure switch 100$^a$. The circuit has a battery 85$^b$ therein, one terminal of which is connected to the conductor frame 47 of the gyroscope and the other terminal being connected in the circuit as shown.

In order that the pilot may properly observe the direction and degree of banking, the inclinometer F is provided. It represents the pilot view of a low wing monoplane in flight, and includes the horizontal wing bar or index proper 101 connected at its center to a hub 102 which may be in the nature of a gear wheel or segment of a gear wheel. This portion 102 is pivoted at 103 between upright brackets 104, as shown in Figure 4 of the drawings. The wing-like index 101 is mounted so that when horizontally positioned, as shown in Figure 1 of the drawings, it will lie in a horizontal position below the normal horizon 24 delineated upon the turn screen, and will give a stimulus similar to the normal stimulus in the field of view of a pilot during visual flight, that is, with respect to the earth and horizon.

The index 101 is gyroscopically, as well as pendulum controlled, so that it will under all conditions give the pilot an accurate indication of the aircraft's position in flight. To this end, the inclinometer apparatus F includes as a part thereof a gyroscope L, shown in Figures 3, 4 and 6 of the drawings. It includes a casing 105 having a precessing frame 106 mounted therein upon suitable pivots 107 which dispose the pivot precessing axis of the frame 106 in the line of flight of the aircraft. The gyroscopic rotor wheel 108 is rotatably supported on an axis 109 normal to the path of flight of the aircraft, and this wheel is peripherally provided with teeth or grooves sloped in such relation that the fluid jet will rotate the wheel with the top portion thereof traveling rearwardly in the line of flight. The gyroscope L is provided with a suitable pump 110, shown in Figure 3 of the drawings, which extracts the fluid from the bottom of the casing 105 through a conduit 111 and discharges the rotor wheel impelling fluid through a conduit 112 and thence through a nozzle 113 into the rotor casing, as shown in Figure 4. This pump 110 is thus of the same nature as the pump 51$^a$ for the form of gyroscope E above described. Keyed with the precessing frame 106 is a gear member 117, which may be only a segment of a gear if desired; the gear toothed portion thereof extending upwardly through a suitable slot in the top of the gyroscope casing 105 and there intermeshing with the lowermost of a pair of gears 118; the said gears 118 being rotatably supported on pivots 119 carried by the standards 104; and the uppermost of the gears 118 meshing with the teeth of the gear-hub 102 of the index 101, as above mentioned. It is quite apparent that upon making a turn, with the wings of the aircraft properly banked, the gyroscope L will function so that the precessing of the frame 106 through the gears above described will cause the wing type of index 101 to cant in the same direction of bank as the aircraft wing to which the instrument is attached, and to the same degree, as can readily be understood.

In our co-pending application above referred to we have shown an inclinometer which is gravity actuated. During a bank or turn of the aircraft centrifugal force acts on the pendulum of an inclinometer, and therefore the indicator does not give a true stimulus to the observer of the actual position of the aircraft in flight. To obviate this we have provided the gyroscopically controlled type of inclinometer above described. However, it will not suffice to merely control the wing type of indicator 101 by means of a gyroscope, since if during a turn the aircraft is stopped with one of the wings depressed, such as during a side slip, it is readily apparent that the precessing force of the gyroscope would be negative insofar as actuation of the indicator is concerned. However, since under such conditions there will be no centrifugal force appreciably acting on a pendulum, it is intended to make the indicator 101 gravity actuated also. To this end, a pendulum 120 is rigidly connected with the frame 106 of the gyroscope, as shown in Figures 4 and 6 of the drawings, having a lower weighted end 121. The stem of this pendulum 120 is screw threaded and has an adjustable nut 122 thereon which may be adjusted to various positions therealong for increasing or decreasing the gravity swing action of the pendulum. The pendulum 120 is damped by suitable conventional means 123, shown in Figure 6 of the drawings. Therefore, during a side slip with the wings of the aircraft canted to the horizontal, gravity will act upon the pendulum so that the weight thereof swill swing the frame 106, actuating the indicator 101 through the train of gears and giving the pilot of the air craft a true indication of the angularity of the wings of the aircraft.

The climb and glide indicator G comprises an indicator proper 130, movably supported in suitable brackets or bearings 131 upon one of the uprights 104 so as to move in an up and down direction, that is, transverse to the movement of the screen 20. This indicator 130 is in the form of the hood or fore portion of the aircraft normally visible to a pilot during flight. It is mounted so as to be elevated or lowered with respect to the horizon line 24 upon the screen, and gives a stimulus quite similar to the normal stimulus received by a pilot during climb or glide of the aircraft. The operation of the indicator 130 is accomplished by means of a pressure sensitive device M, which is preferably a statoscope of the character set forth in our co-pending application above mentioned, and includes a pressure sensitive diaphragm element 135 disposed within a substantially thermally insulated casing 136. The element 135 has one wall 137 thereof mounted upon an inner wall of the casing 136, so that the opposite diaphragm wall 138 of the element 135 is movable. During rise and fall of the aircraft atmospheric pressure is permitted to enter the compartment 140 in the statoscope casing 136 through the opening 141, and a slow leak of this pressure is permitted to communicate with the interior of the pressure sensitive element through a minute vent duct 142. The movable wall 138 of the pressure sensitive element 135 has a central connection with one end of a rigid rod 144 which is slidably supported upon a track 145. The rod 144 has upwardly facing gear teeth 147 which mesh with the teeth of the gear wheel 150. The wheel 150 is non-rotatable upon a frame 152, one end of the latter, remote from the wheel 150, having a pivoted link 154. The link at its opposite end is pivotally connected with the lower end of the stem of the indicator 130, as shown in Figure 4. A weight 156 on the frame 152 at the opposite side of the wheel 150 from the link connection normally holds the gear wheel 150 upon the teeth of the rack 144, and which position of mesh of the wheel 150 with the rack 147 may be adjusted merely by lifting the frame 152. This enables the indicator 130 to be calibrated with respect to the horizon on the screen 20, as can readily be understood, and to compensate for pressure conditions actuating the element 135.

It is readily apparent that upon rise of an aircraft during a climb the atmospheric pressure will become rarefied, which condition will be rapidly communicated to the chamber 140 and more slowly communicated to the interior of the pressure sensitive element 135, due to the minuteness of the duct 142. Therefore, during a climb the diaphragm wall 138 will move away from the other wall 137 due to greater pressure within the pressure element which cannot balance as quick as the pressure within the chamber 140, and as a result the rack 147 will push the frame 152 therewith, due to the fact that the wheel 150 is keyed to the frame. This causes the indicator 130 to rise above the horizon 24, giving a stimulus similar to the normal stimulus of an aircraft during an actual climb. On the other hand, during a glide the pressure sensitive element will collapse to cause the indicator 130 to lower with respect to the horizon 24, for giving a stimulus upon the instrument similar to the normal flight stimulus during a glide.

The operation of the apparatus will be apparent from the foregoing. It is apparent that the contacts of the gyroscopically controlled circuit maker and breaker arrangement in cooperation with the pressure rheostats will control the amount of current which is permitted to actuate the motor. The gyroscope frame 43 tends to precess in one direction or another according to a right or left hand turn of the aircraft, and it is quite apparent that through the circuit maker and breaker above described the directional rotation of the motor is controlled. The intensity of turn of the aircraft proportionately intensifies the action of the precessing frame of the gyroscope E, and the precessional force of the gyroscope proportionately actuates the pressure rheostats 70 and 71, so that the speed of the motor is directly proportionate to the intensity of turn of the aircraft. It follows that the speed of the endless screen is directly controlled by the speed of the motor. By calibrating and balancing the electric circuit and sensitivity of the gyroscope, the screen movement will correspond accurately to turn intensity of the aircraft upon which the instrument is used.

It can readily be understood that the angular degree of turn of the aircraft may readily be determined by reference to the numerically shaped cloud indicia a, b, c, and d upon the screen; the spacing being in angular designations of 45°.

It is now apparent that, with the index 101 gyro-pendulum control, and the index 130 mounted in front of the endless screen of the flight integrator in visual relation with respect to the horizon depicted thereon, a true stimulus of bank and turn, both as to correctness of angularity and intensity thereof is conveyed to the pilot, which will prevent the occurrence of vertigo and erroneous illusions and interpretations. All of this tends to eliminate fatigue which accompanies ordinary blind flight.

Various changes in the shape, size, and arrangement of parts may be made to the form of invention herein shown and described, without departing from the spirit of the invention or the scope of the claims.

We claim:

1. In an aerial flight instrument the combination of a movable screen-like turn indicating element having a simulated horizon delineated thereon, means for moving the screen proportionate to the intensity, direction and degree of angular turn of the aircraft upon which the instrument is placed, a wing-like inclinometer, means for operating the inclinometer for indicating the inclination of an aircraft to which the instrument is attached, and a climb and glide indicator in the form of part of the body of an aircraft and in such association with the winglike inclinometer and movable transversely to the wing-like index and the fixed horizon, said screen, inclinometer and climb and glide indicator being all disposed in co-relation in the same field of view of a pilot observing the instrument.

2. In a gyroscope the combination of a supporting frame, an oscillatively mounted precessing frame, a gyroscopic rotor wheel operatively supported by the precessing frame on a spin axis normal to the axis of movement of the precessing frame, means for driving the rotor wheel, a pressure rheostat, and means movable with the precessing frame acting against the pressure rheostat in such manner that precessional force therefrom will be expended in pressure operation of said rheostat.

3. In a gyroscopic device the combination of a gyroscope including a precessing frame, a pair of pressure operated rheostats, each including movable pressure pistons, and arms carried for movement with the precessing frame operating upon the pressure pistons of said rheostats in such relation that precessional force of the frame in one direction will operate one arm against one piston and precessional force in the opposite direction will move the other arm against the other piston of the other rheostat.

4. In a gyroscopic device the combination of a gyroscope including a precessing frame, a pressure rheostat including a resistance pile of electrically conductive granules and a resistance controlling plunger operating thereupon, and means mounting the pressure rheostat so that the precessional force incident to precessing of said frame will be dissipated in a slight movement of said plunger for current control purposes.

5. In a gyroscopic device the combination of a gyroscope including a precessing frame, a stationary support having pressure rheostats mounted thereon at opposite sides of the precessing axis of said frame and each including resistance varying pressure pistons, and means fixed with said precessing frame in operative association with said pistons for dissipating precessional force set up in said frame in a movement of one of the pistons when the frame moves to one side of its axis and the other piston when the frame moves to the opposite side of its axis.

6. In an aerial flight instrument the combination of a supporting frame structure, an inclinometer simulating the wing structure of an airplane and pivoted between its ends for right and left tipping, means for actuating the inclinometer to the right or left according to the corresponding inclination of the aircraft to which the instrument is attached, a second indicator carried by the frame and movable in an up and down direction and positioned with respect to the pivot of the inclinometer so as to simulate part of the fuselage structure of an aircraft, and a pressure sensitive instrument actuating said last mentioned indicator for designating climb and glide of the aircraft to which the instrument is attached.

7. In an aerial flight instrument the combination of a supporting frame structure, an inclinometer simulating the wing structure of an airplane and pivoted between its ends for right and left tipping, means for actuating the inclinometer to the right or left according to the corresponding inclination of the aircraft to which the instrument is attached, a second indicator carried by the frame and movable in an up and down direction and positioned with respect to the pivot of the inclinometer so as to simulate part of the fuselage structure of an aircraft, a pressure sensitive instrument actuating said last mentioned indicator for designating climb and glide of the aircraft to which the instrument is attached, a transversely movable screen having a typical sky and earth view depicted thereon and mounted to the rear of said above mentioned indicators in the same field of view as said indicators, and gyroscopic means for moving said screen to the right or left proportionate to the intensity, degree and direction of turn of the aircraft to which the instrument is attached.

8. In an aerial flight instrument the combination of a supporting frame structure, an inclinometer simulating the wing structure of an airplane and pivoted between its ends for right and left tipping, means for actuating the inclinometer to the right or left according to the corresponding inclination of the aircraft to which the instrument is attached, a second indicator carried by the frame and movable in an up and down direction and positioned with respect to the pivot of the inclinometer so as to simulate part of the fuselage structure of an aircraft, a pressure sensitive instrument actuating said last mentioned indicator for designating climb and glide of the aircraft to which the instrument is attached, a transversely movable screen having a typical sky and earth view depicted thereon and mounted to the rear of said above mentioned indicators in the same field of view as said indicators, gyroscopic means for moving said screen to the right or left proportionate to the intensity, degree and direction of turn of the aircraft to which the instrument is attached, said screen having an artificial fixed horizon thereon located with reference to the climb and glide indicator, so that during normal flight the tip of the climb and glide indicator will lie substantially level with the fixed horizon in the field of view of the pilot of the aircraft.

9. In combination, a turn indicator surface having a simulated horizon thereon, gyroscopically controlled means for bodily moving said surface from left to right and vice versa upon turning of an aircraft to which the turn indicator surface is attached, a movable bank indicator including a wing-like indicating element pivoted between its ends in the same field of view as said turn indicator surface, a climb and glide indicator simulating the fore fuselage portion of an aircraft and mounted adjacent to the pivot of the bank indicator for movement in an up and down direction with reference thereto and in the same field of view as said indicator surface, and pressure sensitive means for operating said climb and glide indicator.

10. In combination, a turn indicator including a movable screen having a pictorial effect depicted thereon representative of earth and sky views as normally seen by a pilot of an aircraft during flight, a statoscopically controlled rise and fall indicator simulating the fore portion of an aircraft as seen by the pilot during flight and movable over the pictorial effect on the screen in the same field of view therewith, and a movable bank indicator including an indicating element in the form of the wing of an aircraft and cooperatively positioned with respect to the rise and fall indicator in designation of an aircraft in flight in the same field of view as said pictorial effect upon the screen and in a co-related association therewith.

11. In an aerial flight instrument the combination of a supporting frame structure including a screen having a simulated horizon designated thereon with a typical sky view in clear weather designated on the screen above the horizon, a movable indicator of elongated formation substantially in the form of an airplane wing pivoted between its ends upon the frame structure and in normal horizontal visually associated relation below the said simulated horizon, a gyroscope including a precessing frame operatively connected with the indicator for tilting the latter to designate right and left banks of the aircraft on which the instrument is positioned.

12. In an aerial flight instrument, the combination of a supporting frame structure, an inclinometer simulating the wing structure of an airplane pivoted between its ends for right and left tipping, means for actuating the inclinometer to the right or left according to the corresponding inclination of the aircraft to which the instrument is attached, a second indicator carried by the frame and movable in an up and down direction and positioned with respect to the pivot of the inclinometer so as to simulate part of the fore structure of an aircraft, and means actuating said last mentioned indicator for designating climb and glide of the aircraft to which the instrument is attached.

13. In an aeral flight instrument the combination of a frame structure, a screen movable on the frame structure from left to right and vice versa, said screen having depicted thereon a view similar to the normal flight stimulus received by a pilot during flight, controlling means for moving the screen proportionate to the turn of the aircraft upon which the instrument is placed, a tiltable inclinometer pivoted in co-related field of view with the screen, means for operating the inclinometer for indicating the inclination of the aircraft upon which the instrument is attached, a climb and glide indicator movably supported upon the frame for travel in an up and down direction substantially in a path normal to the screen movement and in co-related field of view therewith and with the inclinometer, and means actuated by the climb or glide angular position of the aircraft for moving said climb and glide indicator.

14. In an aerial flight instrument the combination of a supporting frame structure, a screen movable from left to right and vice versa upon the frame structure having a view depicted thereon similar to the normal flight stimulus received by a pilot during clear flight including a fixed horizon thereon, gyroscopically controlled means for moving said screen from left to right or vice versa proportionate to the intensity, direction and degree of angular turn of the aircraft upon which the instrument is placed, a substantially winglike inclinometer pivoted between its ends in co-related field of view with the scene depicted on the screen, gyroscopically controlled means for operating the inclinometer and indicating the inclination of the aircraft upon which the instrument is attached, pendulum means cooperatively associated with the inclinometer for gravity actuation of the latter, a climb and glide indicator carried by the frame movable in an up and down direction normal to the screen movement and positioned with respect to the inclinometer so as to simulate part of the aircraft structure of which the inclinometer wing is a part, and a pressure sensitive instrument actuating said last mentioned indicator for designating climb and glide of the aircraft to which the instrument is attached, said climb and glide indicator being positioned in co-related field of view with the screen in adjacent visual association with the horizon upon said screen.

15. In an aerial flight instrument, the combination of a supporting frame structure, an inclinometer simulating the wing structure of an airplane pivoted between its ends for right and left tipping, means for actuating the inclinometer to the right or left according to the corresponding inclination of the aircraft to which the instrument is attached, and a climb and glide indicator having an indicating member simulating part of an aircraft in co-relation to the wing structure of the inclinometer and movable in an up and down direction.

16. In an aerial flight instrument, the combination of a supporting frame structure, an inclinometer simulating the wing structure of an airplane pivoted between its ends for right and left tipping, means for actuating the inclinometer to the right or left according to the corresponding inclination of the aircraft to which the instrument is attached, a climb and glide indicator having an indicating member simulating part of an aircraft in corelation to the wing structure of the inclinometer and movable in an up and down direction, and a turn indicator having a movable turn indicating screen with a path of travel from right to left and vice versa in a line normal to the path of travel of the climb and glide indicator, said screen having indicia thereon furnishing a foreground in co-related association with the indicating elements of the climb and glide indicator and inclinometer and in the same field of view.

CARL J. CRANE.
WILLIAM C. OCKER.